(12) United States Patent
Flynn

(10) Patent No.: US 6,373,041 B1
(45) Date of Patent: Apr. 16, 2002

(54) IMAGE TRACKER HAVING MEANS FOR ELIMINATING SYSTEMATIC ERROR IN CENTROID DETERMINATION OF RECONSTRUCTED IMAGES

(75) Inventor: David J. Flynn, Sandy Hook, CT (US)

(73) Assignee: Godrich Corporation, Charlotte, NC (US)

( * ) Notice: Subject to any disclaimer, the term of this patent is extended or adjusted under 35 U.S.C. 154(b) by 0 days.

(21) Appl. No.: 09/507,162

(22) Filed: Feb. 18, 2000

(51) Int. Cl.[7] .................. G01C 21/02; G01C 21/24; G01C 1/20
(52) U.S. Cl. .................. 250/203.1; 250/201.9; 250/203.2; 250/208.1
(58) Field of Search .................. 250/203.1, 201.9, 250/203.2, 203.6, 208.1

(56) References Cited

PUBLICATIONS

Feinleib et al., "High Speed/Low Light Wavefront Sensor SYstem", U.S. Statutory Invention Registration, (1989).*
Brian F. Alexander & Kim Chew NG, Elimination of systematic error in subpixel accuracy centroid estimation Optical Engineering/Sep. 1991/vol. 30 No. 9/1320–1331.
William B. Wetherell, The Calculation of Image Quality, Applied Optics and Optical Engineering/vol. VIII/1980/p. 256–269, Academic Press, NY/London/Toronto/Sydney/San Francisco.

* cited by examiner

Primary Examiner—Robert H. Kim
Assistant Examiner—Courtney Thomas
(74) Attorney, Agent, or Firm—James M. Rashid; Calfee, Halter & Griswold

(57) ABSTRACT

A system and method which substantially eliminates systematic error in a centroid determination of reconstructed waveforms from images generated by an image sensor. In accordance with the invention, a predetermined wavefront error is added to an input wavefront and the wavefront is detected. The predetermined wavefront error is effective to improve centroid determination. In the illustrative embodiment, the input wavefront is passed through a random phase plate. The phase plate is an optical window in which the thickness in a z-axis varies randomly over an X/Y plane. The random phase plate acts as a low pass filter and the output of the phase plate is an aberrated wavefront. That is, the nonuniform thickness of the phase plate generates random spatial phase errors in the optical wavefront. The autocorrelation function of the phase plate is such that random phase errors in the optical wavefront will filter out spatial frequencies higher than one cycle per pixel. Hence, the systematic centroiding error is reduced. In the illustrative embodiment, the aberrated wavefront is imaged onto a charge coupled device (CCD) detector by an optical arrangement. The optical arrangement may be implemented with either lenses or mirrors. The CCD is composed of discrete pixels which spatially sample the optical image and converts the photons in the blurred optical image into electrons. An analog-to-digital (A/D) converter converts the analog voltage to a digital signal. A digital circuit reformats the digital signal and provides an interface to a microprocessor. Software running on the microprocessor computes the position of the image centroid on the CCD using the digitized pixel data in a conventional manner.

24 Claims, 2 Drawing Sheets

IMAGE TRACKER HAVING MEANS FOR ELIMINATING SYSTEMATIC ERROR IN CENTROID DETERMINATION OF RECONSTRUCTED IMAGES

BACKGROUND OF THE INVENTION

1. Field of the Invention

The present invention relates to imaging systems. More specifically, the present invention relates to image trackers.

2. Description of the Related Art

Star sensors, wavefront sensors, target tracking and other image tracking devices often utilize an array of charge coupled devices (CCDs). These devices measure the location of an image spot on a picture element (pixel) of the CCD array with subpixel accuracy. Unfortunately, conventional devices are subject to numerous error sources. One such error source is known as a "systematic error" or "S-curve" error. Systematic error appears as an aliasing effect when a centroid is computed from a waveform reconstructed from sampled pixelized input data.

One of the prior approaches to the systematic error is to add a systematic (e.g., spherical) aberration to the lens of the optical system. However, there are numerous shortcomings associated with this approach. First, the aberrations are generally wavelength dependent. Also, it tends to be an ad hoc approach adding considerable error to the image.

In "Elimination of Systematic Error in Subpixel Accuracy Centroid Estimation", published in the September 1991 issue of OPTICAL ENGINEERING, vol. 30, no. 8, pages 1320–1331, B. Alexander and K. Ng disclosed how systematic error occurs using a Fourier technique. Alexander and Ng determined that systematic centroiding error will occur if spatial frequencies are present above one cycle per pixel. Their approach to the elimination of those frequencies and the associated systematic error was to step down the aperture and increase the f-number of the associated optical system. However, one disadvantage of this approach is that if the aperture is down-sized, the sensitivity of the sensor will be degraded.

Hence, a need remains in the art for a system or technique for eliminating systematic error in the centroid determination of reconstructed waveforms from images generated by CCD image sensors.

SUMMARY OF THE INVENTION

The need in the art is addressed by the system and method of the present invention. The system and method of the invention substantially eliminates systematic error in a centroid determination of reconstructed waveforms from images generated by an image sensor. In accordance with the invention, a predetermined wavefront error is added to an input wavefront and the wavefront is detected. The predetermined wavefront error is effective to improve centroid determination.

In the illustrative embodiment, the input wavefront is passed through a random phase plate. The phase plate is an optical window in which the thickness in a z-axis varies randomly over an X/Y plane. The random phase plate acts as a low pass filter and the output of the phase plate is an aberrated wavefront. That is, the nonuniform thickness of the phase plate generates random spatial phase errors in the optical wavefront. The autocorrelation function of the phase plate is such that random phase errors in the optical wavefront will filter out spatial frequencies higher than one cycle per pixel. Hence, the systematic centroiding error is reduced.

In the illustrative embodiment, the aberrated wavefront is imaged onto a charge coupled device (CCD) detector by an optical arrangement. The optical arrangement may be implemented with either lenses or mirrors. The CCD is composed of discrete pixels which spatially sample the optical image and converts the photons in the blurred optical image into electrons. The electrons collected in each detector pixel are converted into a voltage by an analog signal processing circuit. An analog-to-digital (A/D) converter converts the analog voltage to a digital signal. A digital circuit reformats the digital signal and provides an interface to a microprocessor. Software running on the microprocessor computes the position of the image centroid on the CCD using the digitized pixel data in a conventional manner.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
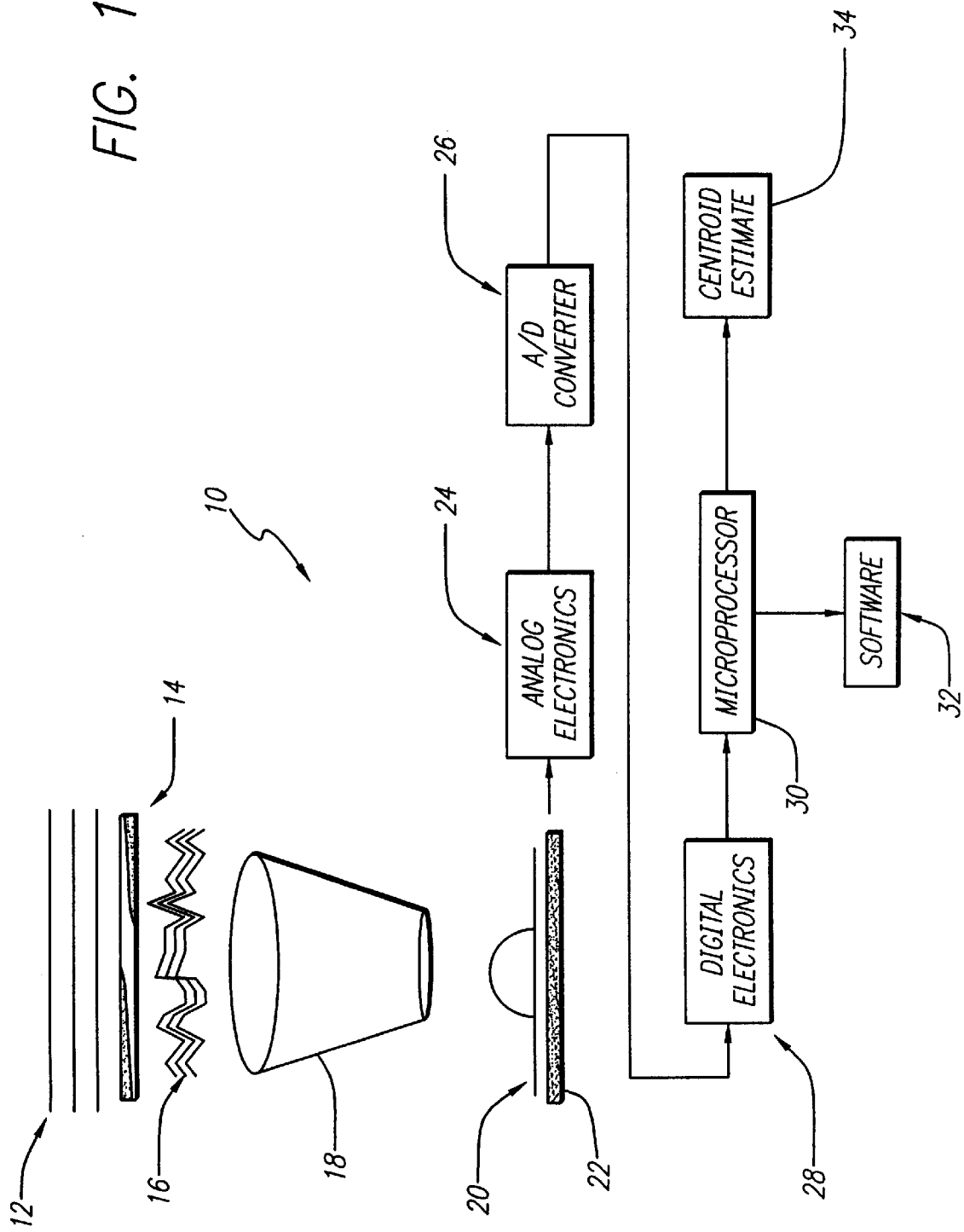
FIG. 1 is a block diagram of an image tracking system incorporating the teachings of the present invention.

FIG. 1 is a block diagram of an image tracking system incorporating the teachings of the present invention. As illustrated in FIG. 1, the system 10 receives a wavefront 12 of energy. In the illustrative embodiment, the input wavefront 12 is electromagnetic energy (e.g., optical). Those skilled in the art will appreciate that the present teachings may be utilized with energy suitable for a given application without departing from the scope of the present teachings.

In accordance with the invention, a random wavefront error is added to the wavefront by a phase plate 14. While the invention is described herein with reference to the use of a random phase plate to randomize the input wavefront, those skilled in the art will appreciate that the invention is not limited thereto. Other means for randomizing the wavefront, reflective or transmissive, may be used without departing from the scope of the present teachings.

In Chapter 6 of volume III of *Applied Optics and Optical Engineering*, published by the Academic Press in 1980, at pages 256–269, W. B. Wetherell explains that a commonly used model for the autocorrelation function for random wavefront error is the Gaussian model:

$$\phi_{11}(S) = \exp(-S/l^2) \text{ or } \phi_{11}(vn) = \exp(-4v_n^2/l^2) \quad [1]$$

(The reader is advised to consult the reference for a detailed discussion of the problem of MTF degradation due to random wavefront error and a definition of the terms in equation [1].)

Accordingly, in the illustrative embodiment, the phase plate 14 is designed to have an autocorrelation function such that random phase errors in the optical wavefront will filter out spatial frequencies higher than one cycle per pixel. (At spatial frequencies less than one cycle per pixel, the simple autocorrelation function set forth in equation [1] is valid and the MTF stays within a given error margin.) Accordingly, in the illustrative implementation, the thickness of the phase plate in a z-axis varies randomly over an X/Y plane. As a result, in accordance with the present teachings, the input image is blurred to eliminate centroiding errors. In almost all optical systems the goal is to generate the tightest point spread function possible, a diffraction limited image. In such a system aberrations due to fabrication errors, or atmospheric turbulence, degrade performance. The present invention is an exception to this.

Figure 2:
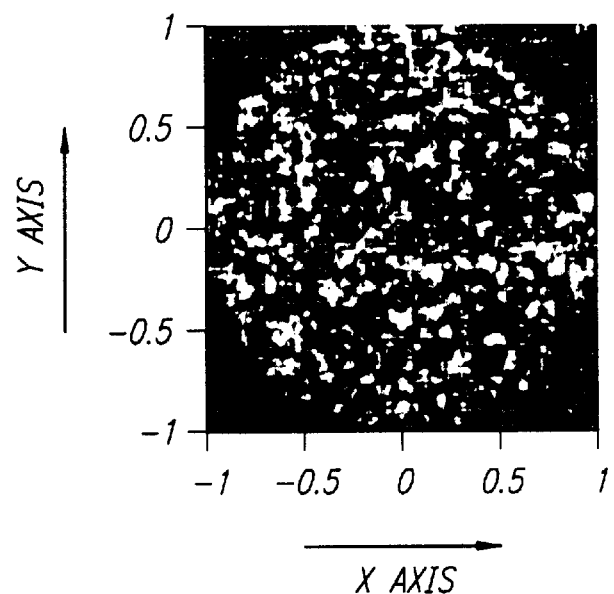
FIG. 2 is a front view of the phase plate constructed in accordance the teachings of the present invention and utilized in the image tracker of FIG. 1.

FIG. 2 is a front view of an illustrative implementation of a phase plate constructed in accordance the teachings of the present invention and utilized in the image tracker of FIG. 1. FIG. 2 is meant to illustrate a circular optical element (phase plate) with a random variation in the glass thickness from point to point in the X, Y plane. The thickness of the glass is shown in gray scale.

Figure 3:
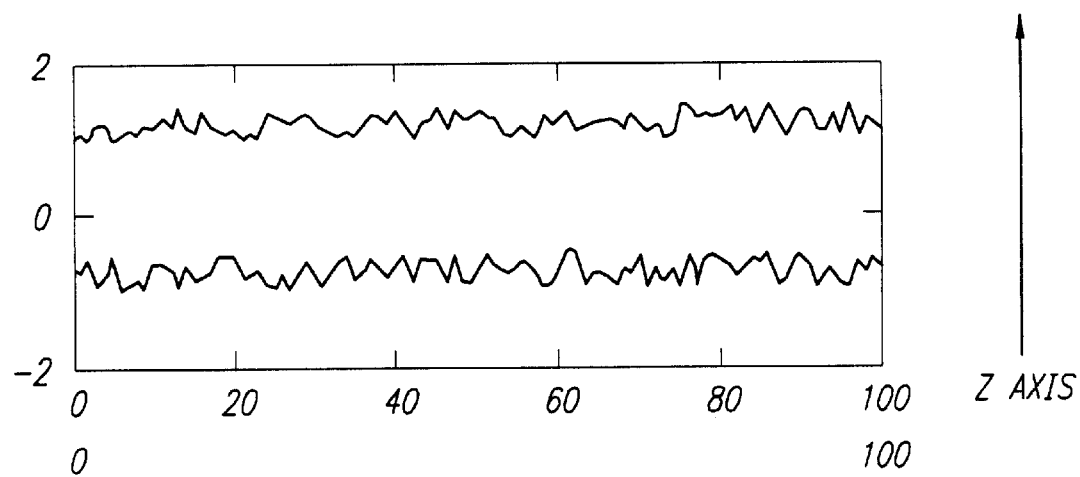
FIG. 3 is a side view of the phase plate illustrated in FIG. 2.

FIG. 3 is a "slice" through the phase plate and shows the variation in the thickness of the glass in Z-axis as one moves along a line in the X-Y plane.

Both FIGS. 2 and 3 are illustrative examples and do not represent an actual application. They are meant to show a optical element whose thickness in the Z-axis varies randomly from point to point in the X-Y plane. The actual implementation will be application dependent.

The phase plate 14 is an optical window constructed of optical grade glass, plastic or other suitable material. The random phase plate 14 acts as a low pass filter. The nonuniform thickness of the phase plate generates random spatial phase errors in the optical wavefront, resulting in an aberrated wavefront 16.

In the illustrative embodiment, the aberrated wavefront 16 is imaged onto a charge coupled device (CCD) detector 22 by an optical arrangement 18. The optical arrangement 18 may be implemented of conventional design with either lenses or mirrors. In the illustrative embodiment, the phase plate 14 is positioned in the collimated space in front of the optical arrangement 18. Those skilled in the art will appreciate that the input waveform randomizing element may follow or be integrated into the optical arrangement 18 without departing from the scope of the present teachings.

In the illustrative implementation, the phase plate 14 degrades the modulation transfer function (MTF) of the optical arrangement 18 such that the optical system generates an output image 20 having a blurred point spread function (PSF) in response to the input wavefront 12. The phase plate 14 thereby creates an effect similar to that caused by atmospheric turbulence. Those skilled in the art will appreciate that the phase plate could be designed to generate a wavefront with a Fried $r_0$ parameter that would result in the desired MTF cutoff frequency and/or PSF blur.

The detector 22 is conventionally designed to include a plurality of discrete pixels which spatially sample the optical image and convert the photons in the blurred optical image into electrons. The electrons collected in each detector pixel are converted into a voltage by an analog signal processing circuit 24. An analog-to-digital (A/D) converter 26 converts the analog voltage to a digital signal. A conventional digital circuit 28 reformats the digital signal and provides an interface to a conventional microprocessor 30. Software 32 running on the microprocessor computes the position of the image centroid on the CCD using the digitized pixel data in a conventional manner.

Accordingly, the system and method of the present invention substantially eliminates systematic error in a centroid determination of reconstructed waveforms from images generated by an image sensor.

Thus, the present invention has been described herein with reference to a particular embodiment for a particular application. Those having ordinary skill in the art and access to the present teachings will recognize additional modifications applications and embodiments within the scope thereof For example, the invention is not limited to a mount of a randomizing element (e.g., the phase plate) in front of the optical elements of the system. The randomizing element may be positioned in or after the optical elements without departing from the spirit and scope of the present invention.

It is therefore intended by the appended claims to cover any and all such applications, modifications and embodiments within the scope of the present invention.

Accordingly,

What is claimed is:

1. A system for eliminating systematic error in a centroid determination of reconstructed waveforms from images generated by an image sensor comprising;

first means for adding random spatial phase errors to an input wavefront to reduce substantially spatial frequencies higher than one cycle per pixel in said input wavefront; and second means for detecting the wavefront with the added random spatial phase errors for said centroid determination, whereby the systematic error in the determined centroid is eliminated substantially as a result of the added random spatial phase errors.

2. The invention of claim 1 wherein the first means comprises a phase plate for adding the random spatial phase errors to the input wavefront.

3. The invention of claim 2 wherein the autocorrelation function of the phase plate is such that random phase errors in the optical wavefront will filter out spatial frequencies higher than one cycle per pixel.

4. The invention of claim 3 wherein the phase plate is an optical window in which the thickness in a z-axis varies randomly over an X/Y plane.

5. The invention of claim 4 wherein the nonuniform thickness of the phase plate will generate random spatial phase errors in the optical wavefront.

6. The invention of claim 2 wherein said second means includes an optical system.

7. The invention of claim 6 wherein said phase plate is disposed at the input of said second means.

8. The invention of claim 7 wherein said second means includes a detector disposed at the output of the optical system.

9. The invention of claim 8 wherein said detector is a charge coupled device.

10. The invention of claim 8 wherein said second means includes an analog signal processing circuit connected to the output of said detector.

11. The invention of claim 10 wherein said second means includes an analog to digital converter for digitizing the output of said analog signal processing circuit.

12. The invention of claim 11 wherein said second means includes a digital signal processing circuit connected to the analog to digital converter.

13. The invention of claim 12 wherein said second means includes a microprocessor connected to said digital signal processing circuit.

14. The invention of claim 13 wherein said second means includes software means executable by said microprocessor for computing the centroid of reconstructed waveforms from images generated by the image sensor.

15. A image processing system comprising:

an arrangement for providing a wavefront;

a phase plate disposed at the input of the arrangement for adding random spatial phase errors to the wavefront to reduce substantially spatial frequencies higher than one cycle per pixel in said wavefront;

sensor means for detecting the output of the phase plate; and a signal processing system for calculating a centroid of reconstructed waveforms from images generated by the sensor means, whereby systematic errors in the calculated centroid are substantially eliminated as a result of the added random spatial phase errors.

16. The invention of claim 15 wherein the autocorrelation function of the phase plate is such that random phase errors in the optical wavefront will filter out spatial frequencies higher than one cycle per pixel.

17. The invention of claim 16 wherein the phase plate is an optical window in which the thickness in a z-axis varies randomly over an X/Y plane.

18. The invention of claim 17 wherein the nonuniform thickness of the phase plate will generate random spatial phase errors in the optical wavefront.

19. The invention of claim 15 wherein said signal processing system includes an analog signal processing circuit connected to the output of said detector.

20. The invention of claim 19 wherein said signal processing system includes an analog to digital converter for digitizing the output of said analog signal processing circuit.

21. The invention of claim 20 wherein said signal processing system includes a digital signal processing circuit connected to the analog to digital converter.

22. The invention of claim 21 wherein said signal processing system includes a microprocessor connected to said digital signal processing circuit.

23. The invention of claim 22 wherein said second means signal processing system includes software means executable by said microprocessor for computing the centroid of reconstructed waveforms from images generated by the sensor means.

24. A method for eliminating systematic error in the centroid determination of reconstructed waveforms from images generated by an image sensor, the method comprising the steps of:

providing an input wavefront;

adding random spatial phase errors to the input wavefront effective to facilitate a substantial elimination of systematic error in the centroid determination; and detecting the wavefront with the random spatial phase errors.

* * * * *

UNITED STATES PATENT AND TRADEMARK OFFICE
CERTIFICATE OF CORRECTION

PATENT NO.    : 6,373,041 B1
DATED         : April 16, 2002
INVENTOR(S)   : David J. Flynn It is certified that error appears in the above-identified patent and that said Letters Patent is hereby corrected as shown below:

<u>Title page,</u>
Item [73], Assignee: please delete "Godrich Corporation" and insert -- Goodrich Corporation --.

Signed and Sealed this

Seventeenth Day of September, 2002

Attest:

JAMES E. ROGAN
*Attesting Officer*  *Director of the United States Patent and Trademark Office*